US012565949B2

(12) United States Patent
Oda et al.

(10) Patent No.: US 12,565,949 B2
(45) Date of Patent: Mar. 3, 2026

(54) RING MEMBER

(71) Applicant: KUBOTA CORPORATION, Osaka (JP)

(72) Inventors: Keita Oda, Amagasaki (JP); Yuito Komaru, Amagasaki (JP); Ryunosuke Tanaka, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/721,752

(22) PCT Filed: Dec. 5, 2022

(86) PCT No.: PCT/JP2022/044660
§ 371 (c)(1),
(2) Date: Jun. 19, 2024

(87) PCT Pub. No.: WO2023/120125
PCT Pub. Date: Jun. 29, 2023

(65) Prior Publication Data
US 2024/0353036 A1 Oct. 24, 2024

(30) Foreign Application Priority Data
Dec. 20, 2021 (JP) ................................. 2021-205637

(51) Int. Cl.
*F16L 21/08* (2006.01)

(52) U.S. Cl.
CPC .................................... *F16L 21/08* (2013.01)

(58) Field of Classification Search
CPC ....... F16L 21/08; F16L 21/035; F16L 21/003; F16L 21/02; F16B 2/08; F16B 21/186
See application file for complete search history.

(56) References Cited

U.S. PATENT DOCUMENTS

| | | | |
|---|---|---|---|
| 4,082,321 A | 4/1978 | Nakajima et al. | |
| 5,896,893 A * | 4/1999 | Toshima | F16L 21/08 |
| | | | 138/109 |
| 2010/0299892 A1* | 12/2010 | Ardern | F16B 2/08 |
| | | | 24/481 |

FOREIGN PATENT DOCUMENTS

| | | |
|---|---|---|
| DE | 2621044 A1 | 11/1976 |
| JP | 51-076626 A | 7/1976 |

(Continued)

OTHER PUBLICATIONS

International Search Report from corresponding International Patent Application No. PCT/JP2022/044660, dated Feb. 14, 2023.

(Continued)

*Primary Examiner* — Aaron M Dunwoody
(74) *Attorney, Agent, or Firm* — RENNER, OTTO, BOISSELLE & SKLAR, LLP

(57) ABSTRACT

A ring member includes a split body having a split part split at a point in the circumferential direction and also includes a tapping screw that connects a first thin-walled portion and a second thin-walled portion forming the split part, which extend in the circumferential direction, in a state where the first thin-walled portion and the second thin-walled portion overlap one another in the radial direction of a first pipe. With the first thin-walled portion located on the radially inner side of the first pipe being fitted in an annular groove formed in the outer circumference of the spigot, the body can come into contact with a lock ring located inside a socket of a second pipe. The body has, on the second thin-walled portion, an engaging portion that is engaged with the first thin-walled portion in the axial direction of the pipes.

3 Claims, 8 Drawing Sheets

(56)         References Cited

FOREIGN PATENT DOCUMENTS

| JP | 54-018767 | B | 7/1979 |
| JP | 09196262 | A | 7/1997 |
| JP | 09-280447 | A | 10/1997 |
| JP | 11-230440 | A | 8/1999 |
| JP | 11-280968 | A | 10/1999 |
| JP | 2001280562 | A | 10/2001 |
| KR | 102185497 | B1 | 12/2020 |

OTHER PUBLICATIONS

Extended European Search Report issued in corresponding European Patent Application No. 22910839.4 dated Feb. 17, 2025.

* cited by examiner

F I G.   1
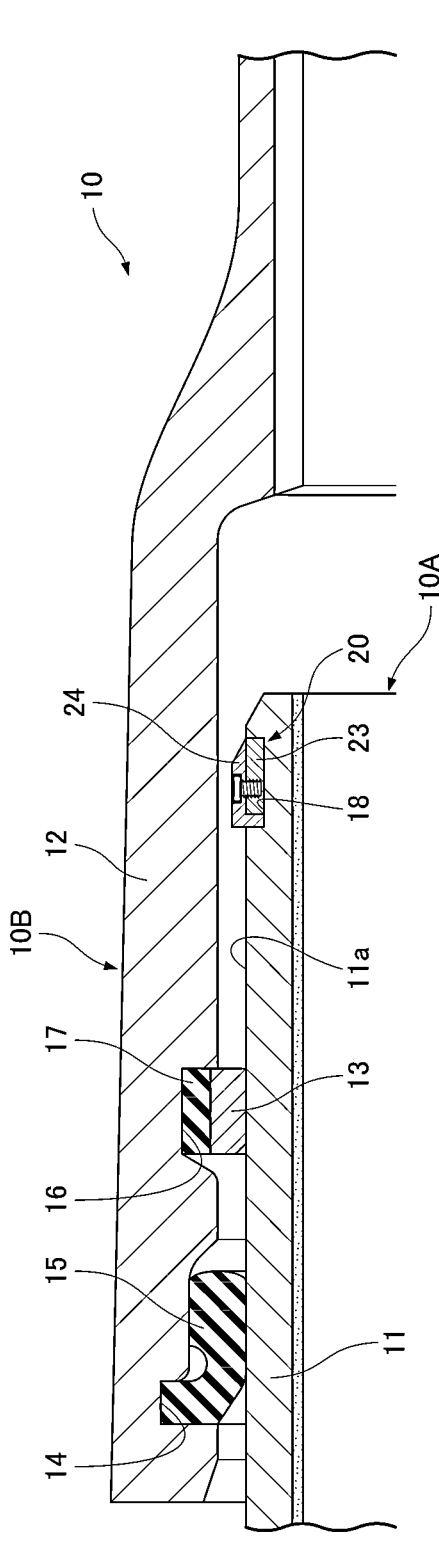

F I G .  2
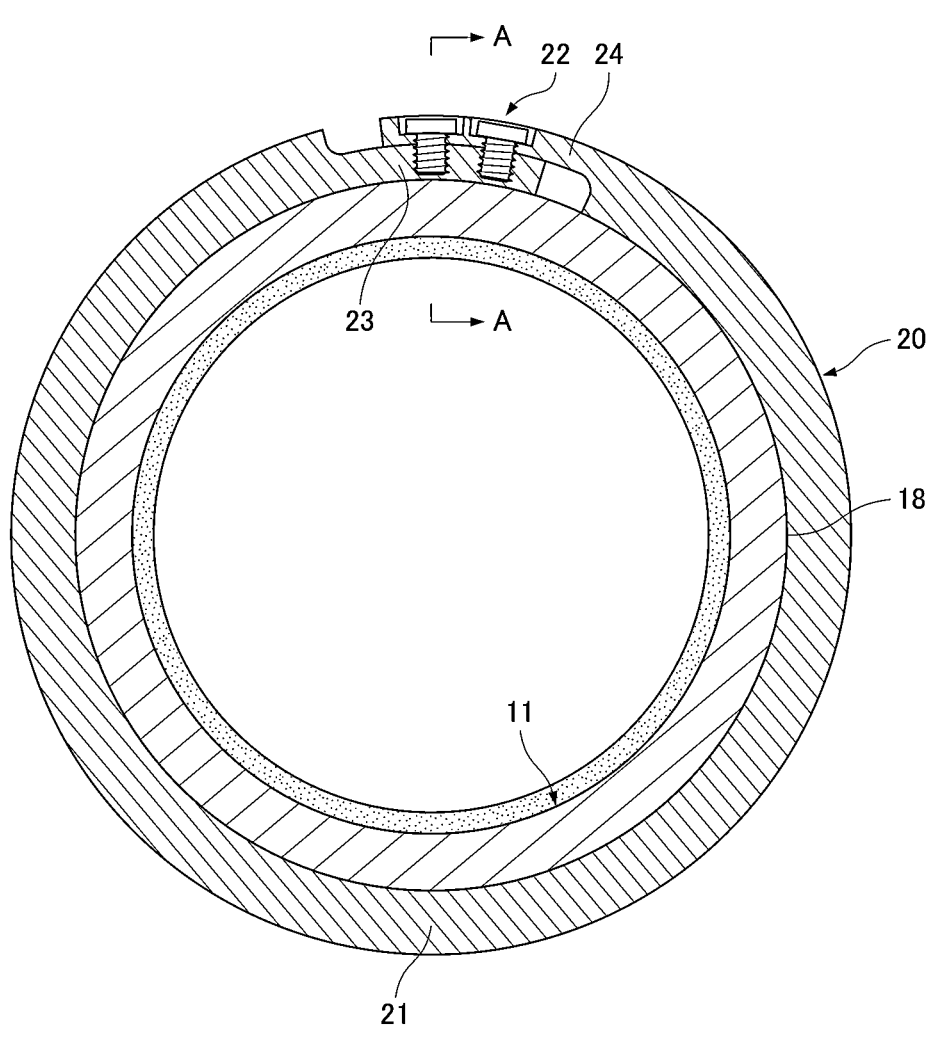

F I G. 3
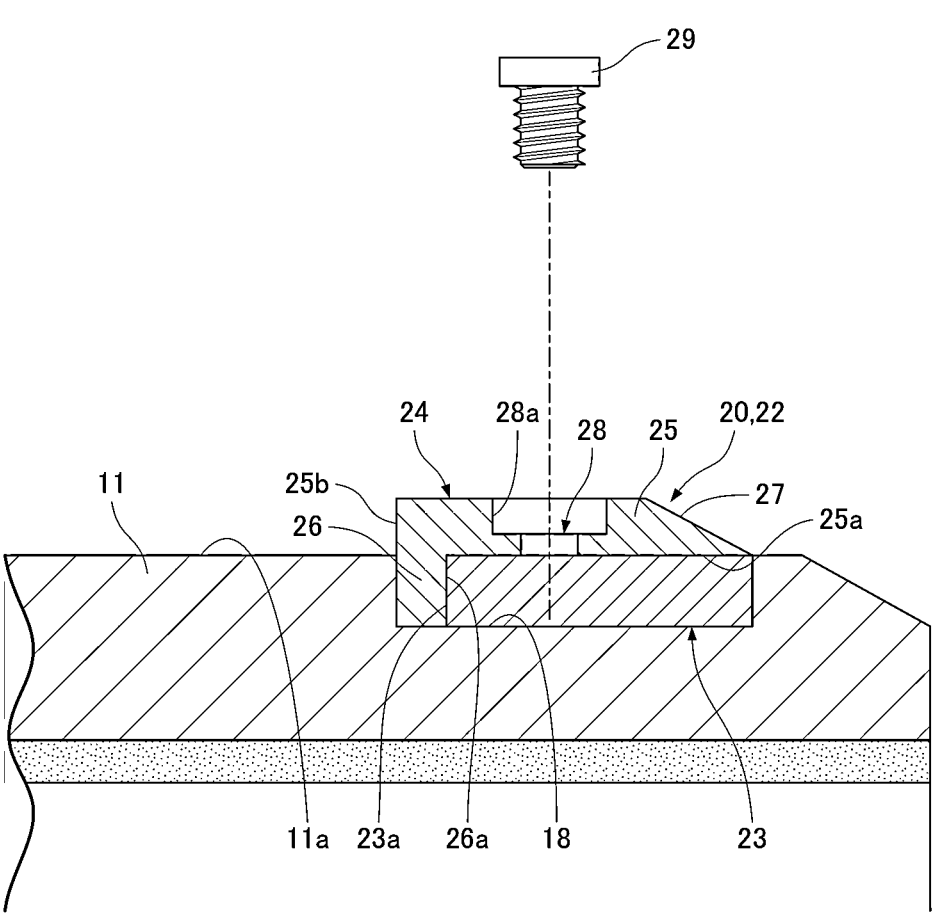

F I G.  4
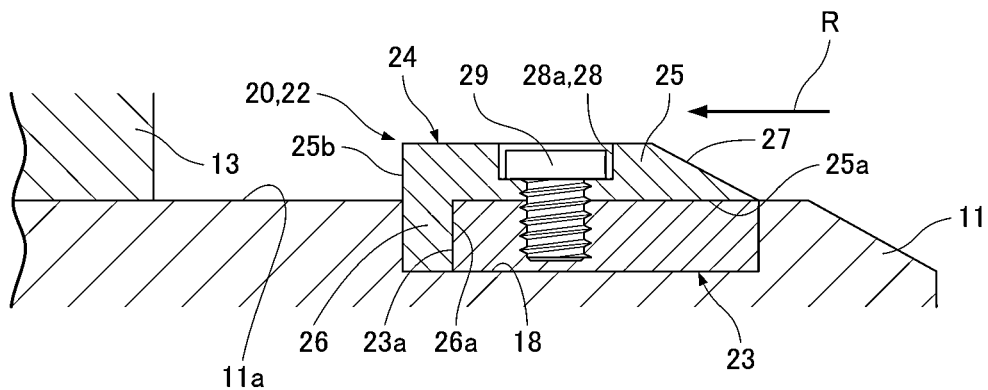

F I G.  6
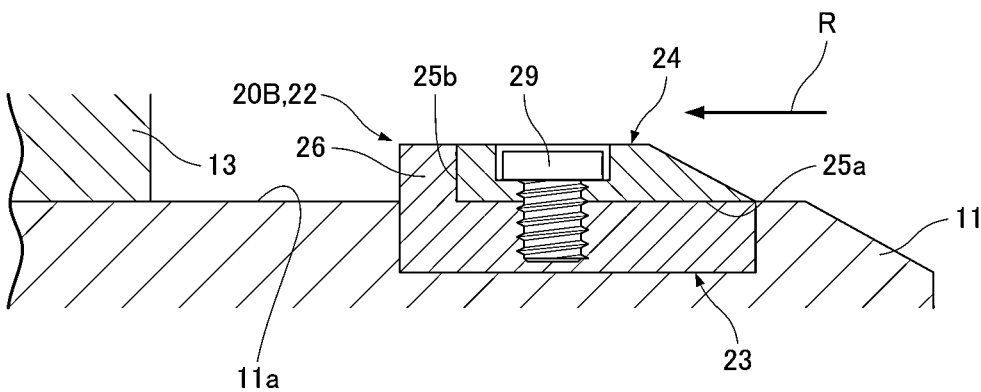

F I G. 7
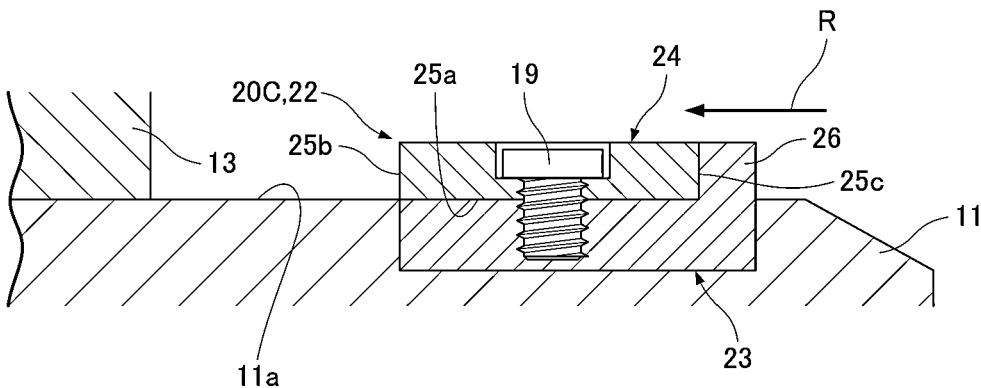

F I G.  8
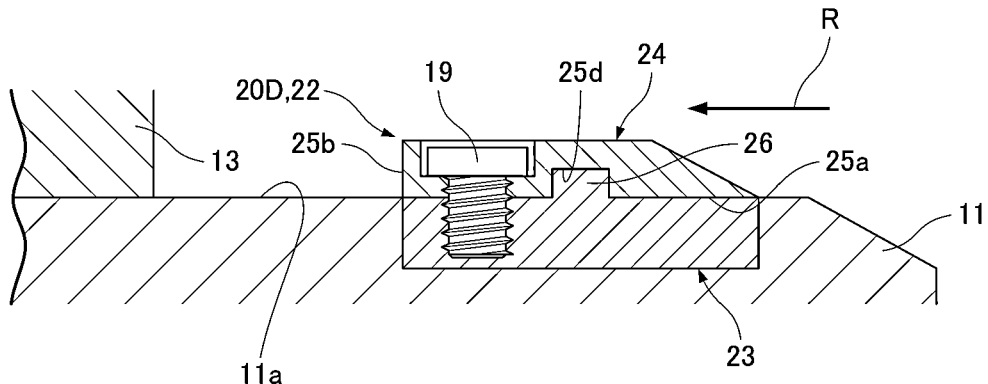

RING MEMBER

FIELD OF THE INVENTION

The present invention relates to a ring member used for a pipe joint. The ring member according to the present invention is fitted in a groove formed in the outer circumference of a spigot of one of pipes to be joined to each other to form a protrusion that protrudes from the outer surface of the spigot and extends in the circumferential direction of the spigot. The protrusion formed according to the present invention comes into contact with a lock ring located inside a socket of the other of the pipes to be joined to each other, thereby preventing the pipes from being separated.

BACKGROUND OF THE INVENTION

Japanese Patent Laid-Open No. 9-196262 discloses a ring member. The ring member is fitted in a groove formed in the outer circumference of a spigot of a pipe to form, on the outer circumference of the spigot, a protrusion for preventing pipes joined to each other from being separated. The ring member has a split part split at a point in the circumferential direction, which is formed by one end portion of the ring member in the circumferential direction and another end portion of the ring member in the circumferential direction. The one end portion and the other end portion overlap one another in the radial direction of the pipes, with the one end portion located on the inner side in the radial direction of the pipes and the other end portion located on the outer side in the radial direction of the pipes, and are connected to each other by a connector member.

When the spigot of one pipe is separating from the socket of the other pipe in an earthquake or the like, the ring member comes into contact with the lock ring in the socket and receives a reaction force (removal prevention force) from the lock ring. Therefore, the displacement of the spigot in the direction to separate from the socket is restricted by the ring member coming into contact with the lock ring. In this way, the spigot can be prevented from separating from the socket in an earthquake or the like.

The ring member according to Japanese Patent Laid-Open No. 9-196262 comes into contact with a lock ring in a state where the ring member is fitted in a groove and thus receives a reaction force (removal prevention force) from the lock ring. Therefore, the other end portion in the circumferential direction of the ring member, which is located on the outer side in the radial direction of the pipes when the one end portion and the other end portion overlap one another and is to come into contact with the lock ring, tends to be displaced in the opposite direction to the spigot removal direction with respect to the one end portion that is located on the inner side in the radial direction of the pipes when the one end portion and the other end portion overlap one another and is fitted in the groove. Therefore, an excessive shearing force acts on the connector member that connects the one end portion and the other end portion in the circumferential direction of the ring member to each other.

An object of the present invention is to provide a ring member that can reduce a shearing force acting on a connector member when the ring member comes into contact with a lock ring.

SUMMARY OF THE INVENTION

A ring member according to the present invention that attains the object described above is used for a pipe joint that prevents a spigot of a first pipe from separating from a socket of a second pipe. The ring member includes: a split part split in the circumferential direction at a point in the circumferential direction; one end portion in the circumferential direction and another end portion in the circumferential direction, the one end portion and the other end portion forming the split part; and a connector member that connects the one end portion and the other end portion of the split part to each other in a state where the one end portion and the other end portion overlap one another in the radial direction of the first pipe. The one end portion is located on the inner side than the other end portion in the radial direction of the first pipe. The ring member is configured in such a manner that the one end portion is fitted into a groove formed in the outer circumference of the spigot and the other end portion can come into contact with a lock ring disposed inside the socket. The ring member has, on one of the one end portion and the other end portion, an engaging portion that is engaged with the other of the one end portion and the other end portion in the axial direction of the pipes when the ring member comes into contact with the lock ring.

According to this, a reaction force (removal prevention force) from the lock ring is received by one of the one end portion and the other end portion of the split part of the ring member that is fitted in the groove via the engaging portion of the other of the one end portion and the other end portion, so that the displacement of the one end portion and the other end portion with respect to each other in the axial direction of the pipes is restricted. Therefore, the shearing force acting on the connector member due to the force that causes the displacement is reduced.

In the ring member according to the present invention, the engaging portion is preferably provided on one of the one end portion and the other end portion of the split part on the side in the axial direction of the pipes where the ring member comes into contact with the lock ring.

According to this, the one end portion and the other end portion of the split part can be engaged with each other at a position close to the position where the ring member and the lock ring come into contact with each other.

In the ring member according to the present invention, the engaging portion is preferably provided on the other end portion and extends inwardly in the radial direction of the pipes.

According to this, the engaging portion can be fitted into the groove of the spigot, and the one end portion and the other end portion forming the split part can be engaged with each other in the groove.

With the ring member according to the present invention, one of the one end portion and the other end portion forming the split part has the engaging portion that is engaged with the other of the one end portion and the other end portion forming the split part when the ring member comes into contact with the lock ring. Therefore, the reaction force (removal prevention fore) from the lock ring that occurs as a result of the ring member coming into contact with the lock ring is received by the other end portion forming the split part and is also received by the one end portion forming the split part via the engaging portion. Therefore, the displacement of the one end portion and the other end portion with respect to each other in the axial direction of the pipes, which would otherwise occur if only the other end portion forming the split part receives the reaction force (removal prevention force) from the lock ring, is unlikely to occur. Therefore, the shearing force acting on the connector member is reduced, and the load on the connector member is reduced. Therefore, when the ring member and the lock ring come into contact with each other in an earthquake or the like, the damage to or deformation of the connector member of the ring member caused by the reaction force (removal prevention force) from the lock ring is unlikely to occur. In this way, the seismic performance of the ring member and therefore of the pipe joint to which the ring member is attached can be improved.

BRIEF DESCRIPTION OF THE DRAWINGS

FIG. 1 a cross-sectional view of a pipe joint having a removal prevention function including a spigot to which a ring member according to a first embodiment of the present invention is attached.

FIG. 2 is a diagram showing the ring member fitted in an annular groove of the spigot.

FIG. 3 is a cross-sectional view taken along the line A-A in FIG. 2, showing the ring member before a tapping screw is attached.

FIG. 4 is a cross-sectional view taken along the line A-A in FIG. 2, showing a case where the spigot is displaced with respect to a socket.

FIG. 6 is a diagram showing a ring member according to a third embodiment of the present invention in a case where a spigot is displaced with respect to a socket.

FIG. 7 is a diagram showing a ring member according to a fourth embodiment of the present invention in a case where a spigot is displaced with respect to a socket.

FIG. 8 is a diagram showing a ring member according to a fifth embodiment of the present invention in a case where a spigot is displaced with respect to a socket.

DETAILED DESCRIPTION OF THE INVENTION

Figure 5:
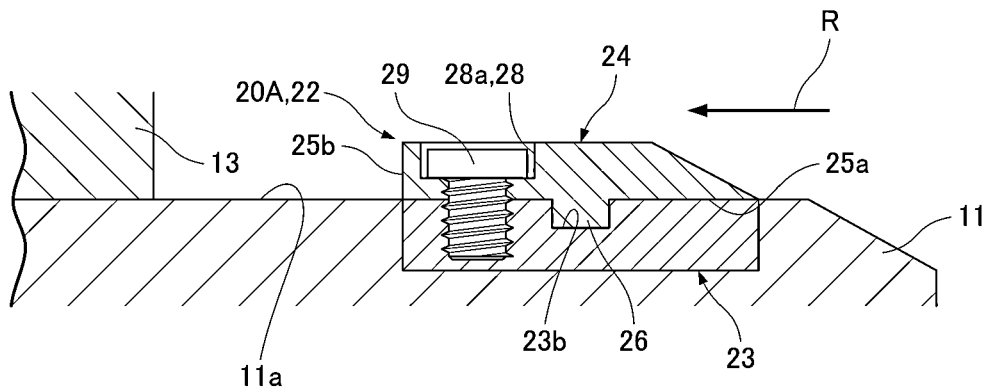
FIG. 5 is a diagram showing a ring member according to a second embodiment of the present invention in a case where a spigot is displaced with respect to a socket.

In the following, a ring member 20 according to a first embodiment of the present invention will be described.

As shown in FIGS. 1 and 2, the ring member 20 according to the first embodiment of the present invention is used for a pipe joint 10.

The pipe joint 10 has a spigot 11 and a socket 12. The spigot 11 is formed at an end of a first pipe 10A. The socket 12 is formed at an end of a second pipe 10B that is to be joined to the first pipe 10A. The spigot 11 is inserted into the socket 12. With the pipe joint 10, the ring member 20 protrudes from an outer circumference 11a of the spigot 11 and comes into contact with a lock ring 13 that is located inside the socket 12, thereby preventing the spigot 11 from separating from the socket 12.

In an inner circumference of a distal end portion of the socket 12, a housing groove 14 for a sealing member is formed. A sealing member 15 made of rubber is fitted in the housing groove 14. In a part of the inner circumference of the socket 12 deeper than the housing groove 14, a housing groove 16 for the lock ring is formed. The lock ring 13 is fitted in the housing groove 16. A ring 17 for centering made of rubber is interposed between an inner circumference surface of the housing groove 16 and an outer circumference surface of the lock ring 13. The ring 17 aligns the axis of the lock ring 13 with the axis of the socket 12.

In the outer circumference 11a of a distal end portion of the spigot 11, an annular groove 18 is formed. The ring member 20 is fitted in the annular groove 18.

The ring member 20 is fitted in the annular groove 18 to form a protrusion that comes into contact with the lock ring 13. As shown in FIG. 2, the ring member 20 is formed by a split body 21 having a split part 22 split in the circumferential direction at a point in the circumferential direction. In other words, the ring member 20 is an open ring member. The split part 22 of the ring member 20 has a first thin-walled portion 23 having a curved shape located on the inner circumference side and a second thin-walled portion 24 having a curved shape located on the outer circumference side. The first thin-walled portion 23 is formed at one end portion in the circumferential direction of the body 21, which constitutes the split part 22. The inner circumference surface of the first thin-walled portion 23 is continuous with the inner circumference surface of the body 21. In other words, the inner circumference surface of the first thin-walled portion 23 extends at the same radial position with the same curvature as the inner circumference surface of the body 21. The second thin-walled portion 24 is formed at the other end portion in the circumferential direction of the body 21, which constitutes the split part 22. The outer circumference surface of the second thin-walled portion 24 is continuous with the outer circumference surface of the body 21. In other words, the outer circumference surface of the second thin-walled portion 24 extends at the same radial position with the same curvature as the outer circumference surface of the body 21.

The first thin-walled portion 23 and the second thin-walled portion 24 overlap one another in the radial direction of the ring member 20 (the radial direction of the first pipe 10A). The first thin-walled portion 23 and the second thin-walled portion 24 are arranged in such a manner that the outer circumference surface of the first thin-walled portion 23 is in contact with the inner circumference surface of the second thin-walled portion 24. The split part 22 of the body 21 is formed so that the sum of the thickness of the first thin-walled portion 23 (the thickness in the radial direction of the ring member 20) and the thickness of the second thin-walled portion 24 (the thickness in the radial direction of the ring member 20) is equal to the thickness of the other part of the body 21 than the split part 22 (the thickness in the radial direction of the ring member 20). The first thin-walled portion 23 and the second thin-walled portion 24 overlap one another over a predetermined length in the circumferential direction and each have a length in the circumferential direction greater than the length of the part thereof overlapping the other. With the first thin-walled portion 23 and the second thin-walled portion 24 configured as described above, the ring member 20 can be increased or decreased in diameter to some extent while the first thin-walled portion 23 and the second thin-walled portion 24 are kept overlapping one another.

As shown in FIGS. 2 and 3, the first thin-walled portion 23 is located on the inner circumference side of the ring member 20 when overlapping with the second thin-walled portion 24. The first thin-walled portion 23 is fitted into the annular groove 18 of the spigot 11 when the ring member 20 is attached to the outer circumference 11a of the spigot 11. The annular groove 18 has a rectangular cross section. The ring member 20 also has a rectangular cross section that corresponds to that of the annular groove 18. The thickness of the first thin-walled portion 23 (the thickness in the radial direction of the ring member 20) is approximately equal to or slightly smaller than the depth of the angular groove 18 in the radial direction of the spigot 11. That is, the first thin-walled portion 23 is totally fitted into the annular groove 18. The width dimension of the first thin-walled portion 23 (the dimension in the axial direction of the ring member 20) is smaller than the dimension in the width direction of the annular groove 18 (the dimension in the axial direction of the pipe joint 10).

The second thin-walled portion 24 has a L-shaped cross section. When the ring member 20 is attached to the outer circumference 11a of the spigot 11, the second thin-walled portion 24 overlaps with the first thin-walled portion 23 and is located on the outer circumference side of the ring member 20. The second thin-walled portion 24 protrudes in the radial direction of the spigot 11 from the outer circumference 11a of the spigot 11 when the first thin-walled portion 23 is fitted into the annular groove 18 of the spigot 11. The second thin-walled portion 24 serves as a protrusion of the spigot 11 that comes into contact with the lock ring 13. That is, the second thin-walled portion 24 comes into contact with the lock ring 13 when the spigot 11 is separating from the socket 12.

As shown in FIGS. 3 and 4, the second thin-walled portion 24 has a contact portion 25 and an engaging portion 26. The engaging portion 26 extends in the vertical direction (toward the inner side in the radial direction) from one end in the axial direction of the contact portion 25, and thus the second thin-walled portion 24 has the L-shaped cross section as described above. The contact portion 25 rests on the outer circumference surface of the first thin-walled portion 23. The contact portion 25 protrudes from the outer circumference 11a of the spigot 11 when the ring member 20 is fitted into the annular groove 18. Since the contact portion 25 protrudes from the outer circumference 11a of the spigot 11, the contact portion 25 comes into contact with the lock ring 13 when the spigot 11 is separating from the socket 12. Therefore, the spigot 11 is prevented from separating from the socket 12. The end portion of the contact portion 25 on the tip end side of the spigot 11 in the axial direction, that is, the end portion of the contact portion 25 opposite to the end portion that comes into contact with the lock ring 13, is tapered toward the tip end of the spigot 11 and thus has an inclined surface 27.

When the contact portion 25 comes into contact with the lock ring 13, the engaging portion 26 is engaged with the first thin-walled portion 23. The engaging portion 26 protrudes inwardly in the radial direction from the contact portion 25. The engaging portion 26 is formed at the end of the contact portion 25 of the second thin-walled portion 24 that is located toward the lock ring 13. When the ring member 20 is attached to the outer circumference 11a of the spigot 11, the engaging portion 26 is fitted into a part of the annular groove 18 of the spigot 11 that is located toward the lock ring 13 and is not occupied by the first thin-walled portion 23. The length of the engaging portion 26 protruding inwardly in the radial direction is approximately equal to or slightly shorter than the depth of the annular groove 18 in the radial direction of the spigot 11.

A hole 28 for insertion of a connector member for connection with the first thin-walled portion 23 is formed in a part of the second thin-walled portion 24, and the hole 28 penetrates the second thin-walled portion 24 in the radial direction of the pipe. The hole 28 has a wide portion 28a on the outer circumference surface side of the second thin-walled portion 24. In the state where the first thin-walled portion 23 and the second thin-walled portion 24 overlap one another in the radial direction of the first pipe 10A, a tapping screw 29, which is an example of the connector member, is inserted in the hole 28 and screwed into the first thin-walled portion 23 to connect the first thin-walled portion 23 and the second thin-walled portion 24 to each other.

In this state, the head of the tapping screw 29 is housed in the wide portion 28a. Since the first thin-walled portion 23 and the second thin-walled portion 24 are connected by the tapping screw 29, the ring member 20 is fixed to the outer circumference of the spigot 11 with a part of the ring member 20 protruding in the radial direction from the outer circumference 11a of the spigot 11 of the first pipe 10A. The first thin-walled portion 23 is connected to the second thin-walled portion 24 in a state where the first thin-walled portion 23 is located in a space defined by a curved surface 25a of the second thin-walled portion 24 and a first vertical surface 26a of the engaging portion 26. The curved surface 25a of the second thin-walled portion 24 is a curved surface on the inner side in the radial direction of the contact portion 25 of the second thin-walled portion 24. The first vertical surface 26a of the engaging portion 26 is a side surface of the engaging portion 26 located toward the first thin-walled portion 23 that extends in the radial direction perpendicularly to the contact portion 25. Since the first thin-walled portion 23 and the second thin-walled portion 24 overlap one another, the first thin-walled portion 23 is held in the annular groove 18 in the state where the first thin-walled portion 23 is covered by the contact portion 25 and engaging portion 26 of the second thin-walled portion 24.

Next, functions of the ring member 20 will be described. As shown in FIG. 4, when the spigot 11 with the ring member 20 attached thereto is separating from the socket 12, the ring member 20 fitted in the annular groove 18 comes into contact with the lock ring 13. Since the ring member 20 comes into contact with the lock ring 13, the displacement of the spigot 11 in a removal direction R is restricted by the lock ring 13. In this state, at the split part 22 of the body 21 of the ring member 20, the second thin-walled portion 24 is in contact with the lock ring 13.

When the ring member 20 comes into contact with the lock ring 13, the ring member 20 receives a reaction force (removal prevention force) from the lock ring 13 in the opposite direction to the removal direction R of the spigot 11. Specifically, the second thin-walled portion 24 of the split part 22 of the body 21 of the ring member 20 receives the reaction force (removal prevention force) from the lock ring 13. More specifically, the second thin-walled portion 24 receives the reaction force (removal prevention force) from the lock ring 13 at a second vertical surface 25b of the contact portion 25. The second vertical surface 25b of the contact portion 25 is a vertical surface that protrudes from the outer circumference 11a of the spigot 11 in the radial direction of the pipe and faces toward the lock ring 13 when the body 21 is fitted in the annular groove 18.

When the second thin-walled portion 24 receives the reaction force (removal prevention force) from the lock ring 13, the second thin-walled portion 24 would otherwise be displaced toward the first thin-walled portion 23 in the opposite direction to the removal direction R of the spigot 11. At this point in time, however, the first vertical surface 26a of the engaging portion 26 of the second thin-walled portion 24 comes into contact with a third vertical surface 23a of the first thin-walled portion 23 in the annular groove 18. The third vertical surface 23a of the first thin-walled portion 23 is a surface of the first thin-walled portion 23 that is perpendicular to the bottom surface of the annular groove 18 when the first thin-walled portion 23 is fitted in the annular groove 18 and faces the first vertical surface 26a of the engaging portion 26 of the second thin-walled portion 24. The third vertical surface 23a of the first thin-walled portion 23 fitted in the annular groove 18 receives the reaction force (removal prevention force) from the lock ring 13 via the engaging portion 26 of the second thin-walled portion 24, so that the displacement of the second thin-walled portion 24 with respect to the first thin-walled portion 23 in the opposite direction to the removal direction R of the spigot 11 is restricted. In this way, even when the second thin-walled portion 24 receives a reaction force (removal prevention force) from the lock ring 13, the displacement of the second thin-walled portion 24 with respect to the first thin-walled portion 23 is unlikely to occur. Therefore, the shearing force acting on the tapping screw 29 as the connector member as a result of the displacement of the second thin-walled portion 24 with respect to the first thin-walled portion 23 is reduced.

As described above, according to the first embodiment, the second thin-walled portion 24 forming the split part 22 of the body 21 of the ring member 20 has the engaging portion 26 that is engaged with the first thin-walled portion 23 that forms the split part 22 when the body 21 of the ring member 20 comes into contact with the lock ring 13. Therefore, the reaction force (removal prevention force) from the lock ring 13 that occurs when the body 21 comes into contact with the lock ring 13 is received by the second thin-walled portion 24 and is also received by the first thin-walled portion 23 via the engaging portion 26. Therefore, the displacement of the second thin-walled portion 24 with respect to the first thin-walled portion 23, which would occur if only the second thin-walled portion 24 receives the reaction force (removal prevention force) from the lock ring 13, is unlikely to occur. Therefore, the shearing force acting on the tapping screw 29 as a result of the displacement of the second thin-walled portion 24 with respect to the first thin-walled portion 23 is reduced, and the load on the tapping screw 29 is reduced. Therefore, when the ring member 20 and the lock ring 13 come into contact with each other in an earthquake or the like, the damage to or deformation of the tapping screw 29 caused by the reaction force (removal prevention force) from the lock ring 13 is unlikely to occur. In this way, the seismic performance of the ring member 20 can be improved.

As described above, according to the first embodiment, the second thin-walled portion 24 has the engaging portion 26 that is to be engaged with the first thin-walled portion 23 on the side where the contact portion 25 comes into contact with the lock ring 13. However, the present invention is not limited to this. For example, like a ring member 20A (second embodiment) shown in FIG. 5, an engaging portion 26 may be provided in a middle part of a second thin-walled portion 24 in the axial direction. In this case, a first recess portion 23b that can be engaged with the engaging portion 26 is formed in a middle part of a first thin-walled portion 23. The engaging portion 26 is fitted in the first recess portion 23b. The other components than those described above are the same as those in the first embodiment. The first recess portion 23b is a groove extending in the circumferential direction in which the engaging portion 26 of the second thin-walled portion 24 can be fitted.

Although the second thin-walled portion 24 has the engaging portion 26 in the first embodiment, the present invention is not limited to this. As shown in FIGS. 6 to 8, a first thin-walled portion 23 to be fitted into an annular groove 18 may have an engaging portion 26. In these cases, the engaging portion 26 protrudes outwardly in the radial direction.

When the first thin-walled portion 23 has the engaging portion 26, like a ring member 20B (third embodiment) shown in FIG. 6, the engaging portion 26 may be provided on the side where the ring member 20B comes into contact with a lock ring 13. In this case, the engaging portion 26 comes into contact with not only the lock ring 13 but also a second vertical surface 25b of a second thin-walled portion 24. The second vertical surface 25b is an end surface of the thin-walled portion 24 located toward the lock ring 13.

Like a ring member 20C (fourth embodiment) shown in FIG. 7, an engaging portion 26 may be provided on a first thin-walled portion 23 on the opposite side to a lock ring 13. In this case, the engaging portion 26 comes into contact with a fourth vertical surface 25C of a second thin-walled portion 24. The fourth vertical surface 25C is an end surface of the second thin-walled portion 24 located on the opposite side to the lock ring 13.

Like a ring member 20D (fifth embodiment) shown in FIG. 8, an engaging portion 26 may be provided on a middle part of a first thin-walled portion 23 in the axial direction. In this case, a second recess portion 25d that can be engaged with the engaging portion 26 fitted therein is formed in a middle part of a second thin-walled portion 24. The second recess portion 25d is a groove extending in the circumferential direction in which the engaging portion 26 of the first thin-walled portion 23 can be fitted. The other components than those described above in the third to fifth embodiments are the same as those in the first embodiment.

Although the first thin-walled portion 23 and the second thin-walled portion 24 are connected to each other by the tapping screw 29 as a fastener element in the first to fifth embodiments, the present invention is not limited to this. The first thin-walled portion 23 and the second thin-walled portion 24 may be connected to each other by connector members formed by other fastener elements, such as a rivet, or other connector members of the non-fastening type.

REFERENCE SIGNS LIST

10 Pipe joint
11 Spigot
11a Outer circumference of spigot
12 Socket
13 Lock ring
18 Annular groove (groove)
20 Ring member
21 Body
22 Split part
23 First thin-walled portion (another end portion)
24 Second thin-walled portion (one end portion)
26 Engaging portion
29 Tapping screw (connector member)

What is claimed is:

1. A pipe joint, comprising:
a spigot of a first pipe;
a socket of a second pipe; and
a ring member configured to prevent the spigot from separating from the socket, the ring member comprising:
a split part split at a point in a circumferential direction;
one end portion in the circumferential direction and another end portion in the circumferential direction, the one end portion and the other end portion forming the split part; and
a connector member that connects the one end portion and the other end portion of the split part to each other in a radial direction of the first pipe in a state where the one end portion and the other end portion overlap one another in the radial direction of the first pipe, wherein the one end portion is located on an inner circumference side in the radial direction of the first pipe, and the other end portion is located on an outer circumference side in the radial direction of the first pipe, wherein the one end portion is fitted into a groove formed in an outer circumference of the spigot and the other end portion is configured to contact a lock ring disposed inside the socket, wherein the ring member has, on the other end portion, an engaging portion that is engaged with the one end portion in an axial direction of the pipes when the ring member comes into contact with the lock ring, wherein a first surface that makes the one end portion and the other end portion engage is provided in the engaging portion in a removal direction of the spigot, wherein the one end portion has another surface coming into contact with the first surface and facing the first surface, and wherein the engaging portion is fitted between the other surface and a side wall of the groove from outside of the radial direction of the first pipe, and wherein the fitted engaging portion contact each of the other surface and the side wall of the groove.

2. The pipe joint according to claim 1, wherein the engaging portion is provided on the one of the one end portion and the other end portion of the split part on a side in the axial direction of the pipes where the ring member comes into contact with the lock ring.

3. The pipe joint according to claim 1, wherein the engaging portion is provided on the other end portion and extends inwardly in the radial direction of the pipes.

\*   \*   \*   \*   \*